United States Patent
Yumoto et al.

(10) Patent No.: US 8,668,041 B2
(45) Date of Patent: Mar. 11, 2014

(54) CONSTRUCTION MACHINE HAVING PLATFORM FOR MAINTENANCE WORK

(75) Inventors: Natsuki Yumoto, Hiroshima (JP); Nobuyuki Maekawa, Settsu (JP); Hideki Kusano, Settsu (JP)

(73) Assignees: Kobelco Construction Machinery Co., Ltd., Hiroshima-shi (JP); Daikin Industries, Ltd., Osaka-shi (JP)

( * ) Notice: Subject to any disclaimer, the term of this patent is extended or adjusted under 35 U.S.C. 154(b) by 0 days.

(21) Appl. No.: 13/509,311

(22) PCT Filed: Sep. 14, 2010

(86) PCT No.: PCT/JP2010/005599
§ 371 (c)(1),
(2), (4) Date: May 11, 2012

(87) PCT Pub. No.: WO2011/058689
PCT Pub. Date: May 19, 2011

(65) Prior Publication Data
US 2012/0224943 A1   Sep. 6, 2012

(30) Foreign Application Priority Data
Nov. 11, 2009  (JP) .................................. 2009-257580

(51) Int. Cl.
*E02F 9/12*  (2006.01)
(52) U.S. Cl.
USPC ...................... 180/291; 180/89.13; 280/164.1; 296/190.05; 414/744.2
(58) Field of Classification Search
USPC ................... 280/762, 763.1, 163, 164.1, 169; 180/89.1, 89.12, 89.13, 311, 291, 292; 296/190.05, 190.04, 190.08; 414/508, 414/682, 744.1, 744.2
See application file for complete search history.

(56) References Cited

U.S. PATENT DOCUMENTS

| 388,357 A * | 8/1888 | Bauer et al. .................... 340/535 |
| 7,377,346 B2 * | 5/2008 | Fujii .......................... 180/69.24 |

(Continued)

FOREIGN PATENT DOCUMENTS

| JP | 11 200415 | 7/1999 |
| JP | 2000 204592 | 7/2000 |

(Continued)

OTHER PUBLICATIONS

International Search Report Issued Dec. 21, 2010 in PCT/JP10/05599 Filed Sep. 14, 2010.

*Primary Examiner* — John Walters
*Assistant Examiner* — Brian Swenson
(74) *Attorney, Agent, or Firm* — Oblon, Spivak, McClelland, Maier & Neustadt, L.L.P.

(57) ABSTRACT

A construction machine including: a lower propelling body; an upper slewing body having a rear region with an engine room; a slewing device for slewing the upper slewing body; and a platform cover. The slewing device includes a slewing electric motor having an electric-motor output shaft, and a speed reducer having a speed-reducer output shaft rotated more slowly than the electric-motor output shaft, the speed reducer installed forward of the engine room such that the speed-reducer output shaft points downward, the slewing electric motor disposed just above the speed reducer. The platform cover is provided on a top of the slewing electric motor, having an upper surface serving as a platform for maintenance of equipment in the engine room. The platform cover is lower than the engine cover and adjacent to a front side of the engine room.

9 Claims, 3 Drawing Sheets

(56) References Cited

U.S. PATENT DOCUMENTS

| | | | |
|---|---|---|---|
| 7,500,532 B2* | 3/2009 | Koga et al. | 180/89.13 |
| 7,988,167 B2* | 8/2011 | Sakitani et al. | 280/163 |
| 8,006,991 B2* | 8/2011 | Taniuchi et al. | 280/164.1 |
| 8,070,170 B2* | 12/2011 | Crawford | 280/6.154 |
| 8,177,387 B2* | 5/2012 | Noda et al. | 362/154 |
| 8,286,741 B2* | 10/2012 | Kawashima | 180/65.285 |
| 8,365,855 B2* | 2/2013 | Mamada et al. | 180/68.1 |
| 2005/0102866 A1* | 5/2005 | Sewell et al. | 37/411 |
| 2008/0034621 A1 | 2/2008 | Taniuchi et al. | |
| 2011/0088637 A1* | 4/2011 | Hirasawa et al. | 123/41.31 |

FOREIGN PATENT DOCUMENTS

| | | |
|---|---|---|
| JP | 2002 88804 | 3/2002 |
| JP | 2004 238864 | 8/2004 |
| JP | 2006 183302 | 7/2006 |
| JP | 2008 45297 | 2/2008 |
| JP | 2008 296680 | 12/2008 |

* cited by examiner

CONSTRUCTION MACHINE HAVING PLATFORM FOR MAINTENANCE WORK

TECHNICAL FIELD

The present invention relates to a construction machine, such as a hybrid excavator, which comprises an upper slewing body and an electric motor for slewing the upper slewing body, having a platform for maintenance work.

BACKGROUND ART

There will be described a background art of the present invention by taking an excavator illustrated in FIG. 6 as an example. This excavator comprises a crawler-type lower propelling body 1, and an upper slewing body 3 mounted on the lower propelling body 1 slewably about a vertical axis. A slewing bearing 2 is interposed between the lower propelling body 1 and the upper slewing body 3, having an inner race fixed on the side of the lower propelling body 1 and an outer race fixed on the side of the upper slewing body 3.

The upper slewing body 3 comprises an upper frame 8 serving as a base, and a work attachment 7 attached to the upper frame 8. The work attachment 7 includes a boom 4 derrickably supported on the upper frame 8, an arm 5 hinged to a distal end of the boom 4, and a bucket 6 attached to a distal end of the arm 5. The upper frame 8 includes a cabin 9 provided in a left front region thereof, an engine room 10 provided in a rear region thereof and having an upward-facing opening, and an engine cover 12 provided to selectively open and close the upper opening of the engine room 10. The engine room 10 houses an engine 11 and various other equipment (these may be collectively called as "engine room equipment" below).

This excavator further comprises a slewing device for slewing the upper slewing body 3. This slewing device comprises: a slewing power source having a slewing power source output shaft; a speed reducer coupled to the slewing power source output shaft and having a speed reducer output shaft, the speed-reducer output shaft adapted to be rotated at a low speed than that of the slewing power source output shaft; a slewing pinion attached to the speed-reducer output shaft; and an internal gear fixed to the inner race of the slewing bearing 2 and meshed with the slewing pinion, the slewing pinion and the internal gear making a mesh movement to thereby transmit a rotational power output of the speed-reducer output shaft to the upper slewing body 3 as a slewing power.

As the slewing power source, a hydraulic motor is used in a hydraulic excavator, and an electric motor (slewing electric motor) is used in a hybrid excavator or an electric excavator. The latter is disclosed, for example, in the following Patent Document 1.

For conventional construction machines including the above excavator, it is an important issue to secure a platform for maintenance work of equipment housed in the engine room 10. In the excavator illustrated in FIG. 6, a maintenance operator opens the engine cover 12 provided on the engine room 10, as illustrated in FIG. 6, and performs maintenance work forward of the engine room 10; in this case, it is difficult to provide a platform for the work within a limited space. Typically used as the platform is equipment (e.g., a hydraulic oil tank or a fuel tank) installed around the engine room 10; however, the platform by utilization of such equipment has such a markedly uneven topography that it is difficult for the operator to perform the work while stably standing thereon.

LIST OF PRIOR ART DOCUMENTS

Patent Documents

Patent Document 1: JP 2008-296680A

SUMMARY OF THE INVENTION

It is an object of the present invention to provide a construction machine capable of securing a platform for stable maintenance work of engine room equipment, without additionally providing a special space.

In order to achieve this object, i.e., in order to secure the platform for maintenance work, the present invention has been made based on a focus on a slewing electric motor of the slewing device. Specifically, a construction machine according to the present invention comprises: a lower propelling body; an upper slewing body mounted on the lower propelling body through a slewing bearing slewably about an axis perpendicular to a ground surface, the upper slewing body having a rear region provided with an engine room having an upward-facing opening and housing various equipment including an engine and an engine cover for selectively opening and closing the opening of the engine room; and a slewing device for slewing the upper slewing body. The slewing device includes: a slewing electric motor having an electric-motor output shaft; a speed reducer which has a speed-reducer output shaft and is coupled to the electric-motor output shaft so that the speed-reducer output shaft is rotated, according to rotation of the electric-motor output shaft, at a speed lower than that of the rotation; and a platform cover. The speed reducer is installed forward of the engine room in such a posture that the speed-reducer output shaft points downward, and the slewing electric motor is disposed just above the speed reducer. The platform cover is provided on a top of the slewing electric motor, and has a flat upper surface serving as a platform for maintenance of the engine room equipment. The slewing device is so disposed that the upper surface of the platform cover is located at a position lower than the engine cover and adjacent to a front side of the engine room.

DESCRIPTION OF EMBODIMENTS

With reference to FIGS. 1 to 5, one embodiment of the present invention will be described.

Figure 6:
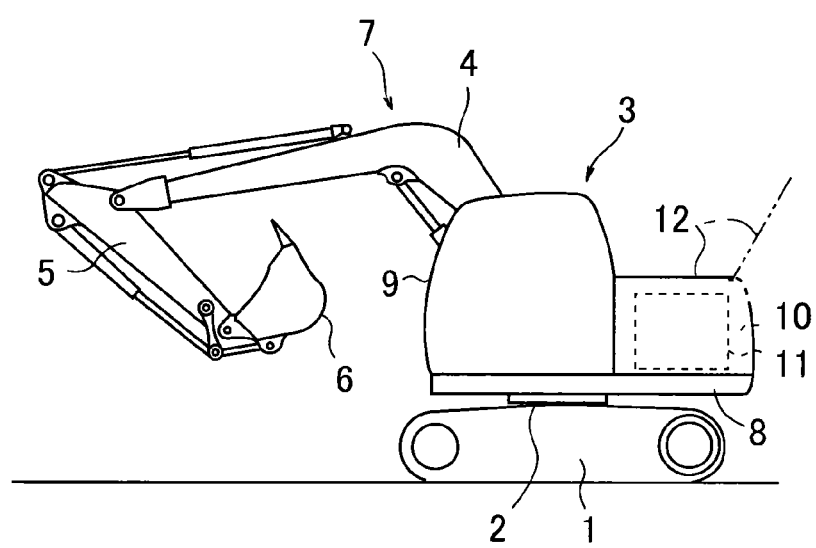
FIG. 6 is a schematic side view of an excavator for explaining the background art of the present invention.

This embodiment is one where the present invention is applied to an excavator. As with the conventional excavator illustrated in FIG. 6, an excavator according to this embodiment comprises a crawler-type lower propelling body 1, and an upper slewing body 3 mounted on the lower propelling body 1 slewably about a vertical axis. A slewing bearing 2 is interposed between the lower propelling body 1 and the upper slewing body 3. The slewing bearing 2 has an inner race fixed on the side of the lower propelling body 1 and an outer race fixed on the side of the upper slewing body 3. The upper slewing body 3 comprises an upper frame 8 serving as a base, and a work attachment 7 attached to the upper frame 8. The work attachment 7 includes a boom 4 supported derrickably on the upper frame 8, an arm 5 hinged to a distal end of the boom 4, and a bucket 6 attached to a distal end of the arm 5. The upper frame 8 includes a cabin 9 provided in a left front region thereof, an engine room 10 provided in a rear region thereof and having an upward-facing opening, and an engine cover 12 provided to selectively open and close the upper opening of the engine room 10. The engine room 10 houses an engine 11 and various other equipment (these may be collectively called as "engine room equipment" below).

Furthermore, in the excavator according to this embodiment, a hydraulic oil tank 13 is disposed rearward of the cabin 9 of the upper frame 8, and a fuel tank 14 is disposed on a left side of the hydraulic oil tank 13.

Figure 3:
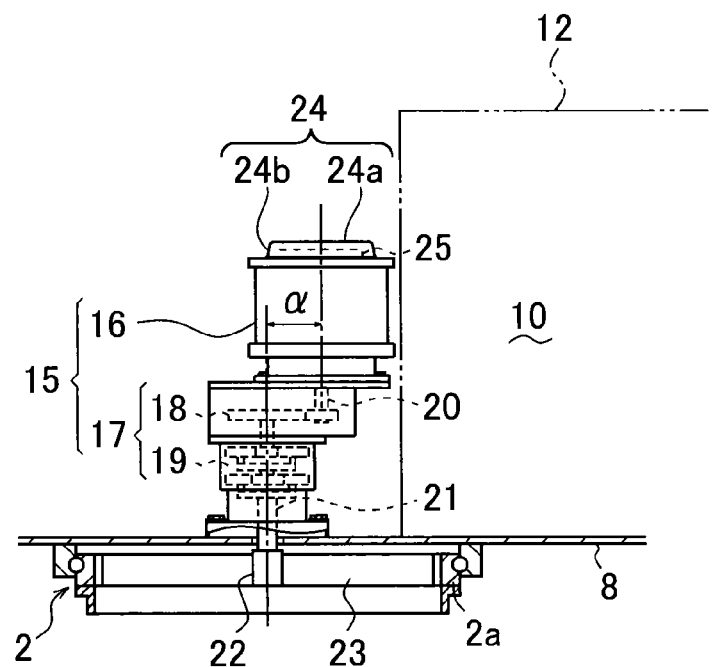
FIG. 3 is a sectional side view enlargedly illustrating a slewing device of the excavator.

The excavator according to this embodiment further comprises a slewing device 15 for slewing the upper slewing body 3. As shown in FIG. 3, the slewing device 15 includes a slewing electric motor 16 serving as a slewing power source, a speed reducer 17, a slewing pinion 22, and an internal gear 23.

The slewing electric motor 16 comprises a rotary shaft 20 serving as an electric-motor output shaft, a motor body (casing), and a rotational speed detector 25 provided on a top of the motor body and operable to detect a rotational speed of the rotary shaft 20. The slewing electric motor 16 is installed on the speed reducer 17 in such a posture that the rotary shaft 20 points downward along a vertical direction.

The speed reducer 17 has a gear mechanism connected to the rotary shaft 20 of the slewing electric motor 16, and a speed-reducer output shaft 21, being disposed on the upper frame 8 in such a posture that the speed-reducer output shaft 21 points downward. The gear mechanism is operable to rotate the speed-reducer output shaft 21, according to rotation of the rotary shaft 20, at a speed lower than that of the rotation of the rotary shaft 20. Specifically, as illustrated in FIG. 3, the gear mechanism of the speed reducer 17 according to this embodiment comprises a spur gear mechanism 18, and a planetary gear mechanism 19 provided in a vertical multi-stage (in the illustrated embodiment, two-stage) manner. The spur gear mechanism 18 includes an input-side spur gear coupled to the rotary shaft 20 and an output-side spur gear coupled to the speed-reducer output shaft 21 via the planetary gear mechanism 19. The two spur gears are meshed with each other in a horizontal direction, making the rotary shaft 20 and the speed-reducer output shaft 21 be offset from each other in the horizontal direction by an offset amount a illustrated in FIG. 3. The planetary gear mechanism 19 is disposed below the output-side spur gear to be vertically aligned with the output-side spur gear to transmit the rotation of the output-side spur gear to the speed-reducer output shaft 21 while sequentially reducing the rotational speed of the rotation.

The slewing pinion 22 is fixed to the speed-reducer output shaft 21, and the internal gear 23 is fixed to the inner race of the slewing bearing 2. The slewing pinion 22 and the internal gear 23 are meshed with each other, and the mesh movement thereof transmits the rotational output of the speed-reducer output shaft to the upper slewing body 3 as a slewing power.

The slewing device 15 is disposed at a position around a center of the upper slewing body 3 and adjacent to a front side of the engine room 10, in such a vertically installed posture that the speed-reducer output shaft 21 points downward in parallel with the rotary shaft 20. Furthermore, in this embodiment, the slewing device 15 is disposed such that the rotary shaft 20 of the slewing electric motor 16 is offset rearward, that is, in a direction to approach the engine room 10, from the speed-reducer output shaft 21.

The slewing device 15 according to this embodiment further includes a platform cover 24. The platform cover 24 is provided on a top of the slewing electric motor 16 disposed on an upper side of the speed reducer 17 to function as a platform for maintenance work of engine room equipment. In this embodiment, the platform cover 24 additionally functions as a rear cover for closing the upper end portion, which is one opposite to an output side, of the upper and lower ends of the motor body (casing) of the slewing electric motor 16.

Figure 5:
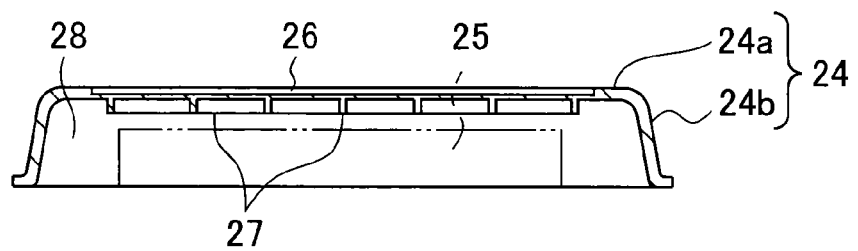
FIG. 5 is a sectional side view enlargedly illustrating a platform cover provided in the slewing device.

Specifically, as shown in FIG. 5, the platform cover 24 has a top wall 24a having such a flat upper surface that an operator can stably place his/her feet thereon, and a sidewall 24b protruding downward from a peripheral edge of the top wall 24a, the top wall 24a and the sidewall 24b having a shape of surrounding an inner space 28. The platform cover 24 can be detachably fixed to the top of the motor body of the slewing electric motor 16, for example, by a screw, in such a manner that a lower end of the sidewall 24b is brought into contact with a top surface of the motor body. The shape of the platform cover 24 allows the platform cover 24 to be hollow and light while having an increased height dimension.

Moreover, the shape of the platform cover 24 according to this embodiment is also set to allow the rotational speed detector 25 to be installed within the inner space 28, as shown in FIG. 5. The shape of the platform cover 24 allows the platform cover 24 to additionally function as a protective cover to protect the rotational speed detector 25. Thus utilizing the platform cover 24 also as the protective cover eliminates a need for providing a special protective cover separately and contributes to a reduced overall cost of the construction machine.

What the platform cover 24 should protect is not limited to the rotational speed detector 25, but may be any other small device. Besides, the platform cover according to the present invention may be one provided separately from the rear cover of the slewing electric motor. For example, the platform cover may be provided on an upper side of the rear cover.

The platform cover 24 is preferably formed of material which gives the platform cover 24 necessary and sufficient strength and rigidity as a platform: preferable one is, for example, aluminum alloy casting. The platform cover 24 according to this embodiment is further provided with many reinforcing ribs 27 as shown in FIG. 5. Each of the ribs 27 protrudes downward from a back surface of the top wall 24a, as shown in FIG. 5. The ribs 27 preferably extend in a plurality of different directions (e.g., extend in a grid pattern along two directions perpendicular to each other) respectively. The ribs 27 can provide sufficient rigidity and strength as a platform to the platform cover 24 despite the hollow structure thereof. In other words, the ribs 27 prevent the platform cover 24 from its deformation and breakage to enhance safety thereof as a platform, especially in this embodiment, enhancing the function of the platform cover 24 as a protective cover for the rotational speed detector 25.

Figure 4:
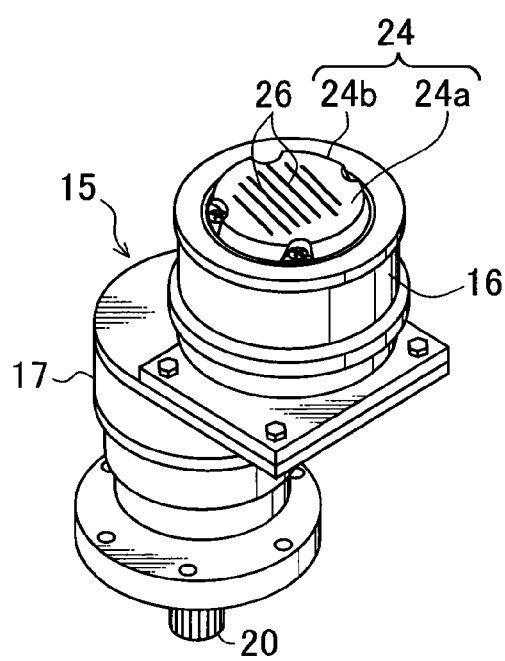
FIG. 4 is a perspective view of the slewing device.

The flatness of the upper surface of the platform cover 24 only has to be enough to function as a platform; therefore, the present invention is not intended to exclude a structure in which the upper surface of the platform cover 24 includes a slight irregularity or inclination in a strict sense. It is rather preferable that the upper surface of the platform cover is not perfectly flat but has a slip suppressing region for suppressing slip. Preferable example of the slip suppressing region is one including a plurality of spaced recesses each having a bottom. In this embodiment, there are formed a plurality of concave grooves 26 in the upper surface of the platform cover 24. The concave grooves 26 may be formed in such an arrangement that they extend parallel to each other, as shown in FIG. 4, or that specific ones of the concave grooves 26 intersect.

The upper surface of the platform cover having the slip suppressing region is able to suppress slip of feet of an operator on the upper surface more effectively than a perfectly flat surface, thus more reliably ensuring safety of the operator. Besides, the recess with the bottom can prevent rainwater and soil from entering the back side of the platform cover, differently from a through-hole penetrating through the platform cover, while exerting the slip suppressing function. In this embodiment, the rotational speed detector 25 can be effectively protected against the rainwater and soil.

The slewing device 15 is disposed so as to locate the platform cover 24 lower than the engine cover 12 and adjacent to the engine room 10. It is more preferable that the height position of the platform cover 24 further satisfies at least one of the following conditions (i) to (iii), which allows a point of view and hands of a maintenance operator to approach a maintenance target, without compelling the operator to an unreasonable forward-bent posture.

(i) The platform cover 24 is located at a height position which is neither excessively high nor excessively low for an operator who steps on the platform cover 24 to perform maintenance work.

(ii) The platform cover 24 is located at a position so higher than equipment around the slewing device 25 that the equipment cannot obstruct the operator.

(iii) The platform cover 24 is located at such a height position as to allow the operator stepping on the platform cover 24 to reach a rear end of the engine room 10.

Figure 1:
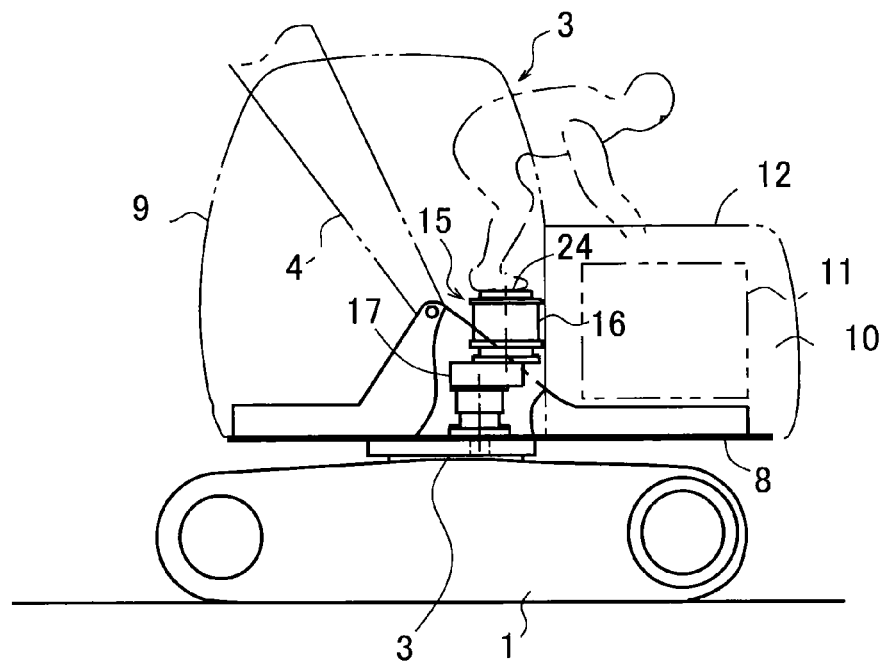
FIG. 1 is a schematic side view of an excavator according to one embodiment of the present invention.

The arrangement of the slewing device 15 satisfying at least one of the above conditions enables an operator to perform maintenance work of the engine room equipment safely and efficiently by use of the platform cover 24 as a platform, as shown in FIG. 1.

Besides, in the case of the speed reducer 17 comprising the spur gear mechanism 18 and the speed-reducing planetary gear mechanism 19 provided below the spur gear mechanism 18 in a vertical multi-stage manner as the above embodiment, the speed reducer 17 can be given a large height dimension by utilization of the vertical arrangement of the gear mechanisms 18 and 19; this permits the height dimension of the entire slewing device 15 to be increased without involving any unreasonable design. This makes it easier to set the platform cover 24 to a height position satisfying the above conditions (i) to (iii).

Figure 2:
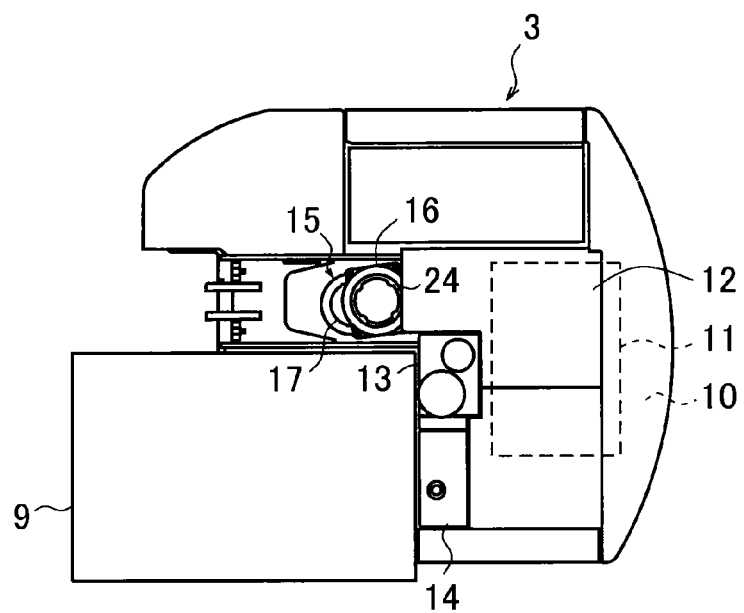
FIG. 2 is a top plan view of the excavator.

The spur gear mechanism 18, which provides a horizontal offset between the rotary shaft 20 and the speed-reducer output shaft 21, can allow the platform cover 24 provided on the top of the slewing electric motor 16 to be located close to the engine room 10 by such an arrangement of the slewing device 15 that the rotary shaft 20 is offset, from the speed-reducer output shaft 21, rearward as shown in FIGS. 1 to 3, i.e., in a direction to approach the engine room 10, in spite that the position of the speed reducer 17 in a front-rear direction should be determined for driving the upper slewing body 3.

The present invention should not be construed to be limited to the above embodiment, but be broadly construed based on the spirit and scope of the present invention hereinafter defined. For example, the present invention includes the following modifications.

(1) The present invention includes an embodiment in which the electric-motor output shaft (rotary shaft 20) of the slewing device 15 is not offset rearward from the speed-reducer output shaft: for example, an embodiment in which both of the output shafts are aligned on the same straight line extending vertically.

(2) The present invention includes an embodiment in which the upper surface of the platform cover 24 is partially or entirely inclined or irregular depending on a relationship with equipment therearound or other conditions, within the bounds of not failing to function as a platform.

(3) As to the platform cover having the slip suppressing region out of ones according to the present invention, the slip suppressing region is not limited to one having the concave grooves 26. The slip suppressing region may comprise a large number of fine depressions or protrusions included in the upper surface of the platform cover, or may comprise an anti-slip sheet superimposed on a cover body of the platform cover, the anti-slip sheet being made of rubber or the like, and formed to have a surface with a high friction coefficient.

(4) The platform cover may have a diameter greater than a maximum diameter of the slewing electric motor so as to enhance the function of the platform cover as a platform. Besides, the platform cover may have a planar shape other than a circular shape, for example, a quadrangular shape such as a rectangular shape or a square shape.

(5) The present invention permits various means to be employed in order to allow the platform cover to be provided at a height position required as a platform. For example, the slewing electric motor or the speed reducer may be modified in a length dimension thereof, or a gear structure of the speed reducer may be designed, as required.

(6) In the slewing device for the construction machine according to the present invention, the mechanism for transmitting a rotation of the speed-reducer output shaft to the upper slewing body as a slewing power is not limited to the aforementioned combination of the internal gear fixed to the inner race of the slewing bearing 3 and the slewing pinion fixed to the speed-reducer output shaft. For example, it is permitted to fix a ring-shaped external gear to an appropriate portion of the lower propelling body 1 and fix a slewing pinion to the speed-reducer output shaft so as to bring the slewing pinion into mesh with the external gear.

As described above, the present invention provides a construction machine capable of securing a platform for stable maintenance work of engine room equipment, without additionally providing a special space. Specifically, a construction machine according to the present invention comprises: a lower propelling body; an upper slewing body mounted on the lower propelling body through a slewing bearing slewably about an axis perpendicular to a ground surface, the upper slewing body having a rear region provided with an engine room having an upward-facing opening and housing various equipment including an engine and an engine cover for selectively opening and closing the opening of the engine room; and a slewing device for slewing the upper slewing body. The slewing device includes: a slewing electric motor having an electric-motor output shaft; a speed reducer which has a speed-reducer output shaft and is coupled to the electric-motor output shaft so that the speed-reducer output shaft is rotated, according to rotation of the electric-motor output shaft, at a speed lower than that of the rotation; and a platform cover. The speed reducer is installed forward of the engine room in such a posture that the speed-reducer output shaft points downward, and the slewing electric motor is disposed just above the speed reducer. The platform cover is provided on a top of the slewing electric motor, and has a flat upper surface serving as a platform for maintenance of the engine room equipment. The slewing device is so disposed that the upper surface of the platform cover is located at a position lower than the engine cover and adjacent to a front side of the engine room.

In this construction machine, the slewing electric motor and the speed reducer constituting the slewing device are arranged in upper and lower relation to each other in this order and the platform cover is provided on the top of the slewing electric motor, whereby the slewing device can be effectively used as a platform for maintenance work of the engine room equipment. In addition, since the slewing device is installed such that the platform cover is located at a position lower than the engine cover for selectively opening and closing a top side of the engine room and adjacent to the front side of the engine room, the maintenance work by use of the platform cover as a platform can be performed in a safe and easy manner. More specifically, the platform cover located at a position lower than the engine cover enables a maintenance operator to bring his/her point of view and hands close to a maintenance target in a realistic forward-bent posture, while expanding an accessible range, thereby facilitating the maintenance work.

The upper surface of the platform cover preferably has a slip suppressing region for suppressing slip. As the slip suppressing region, preferable is a type including a plurality of spaced recesses each having a bottom. The upper surface of the platform cover having the slip suppressing region can suppress slip of feet of an operator on the upper surface more effectively than an entirely flat surface, thereby making safety of the operator more reliable. Besides, the recess having the bottom, differently from a through-hole penetrating through the platform cover, can prevent rainwater and soil from entering the back side of the platform cover, while exerting the slip suppressing function.

The platform cover preferably, for example, has a top wall including the upper surface on which an operator can step and a sidewall protruding downward from a peripheral edge of the top wall, the top wall and the sidewall having a shape surrounding an inner space. This shape enables the platform cover to have an increased height dimension while being hollow and lightweight.

More preferable is that the platform cover comprises a plurality of ribs each protruding downward from a back surface of the top wall to enhance rigidity and strength of the platform cover. These ribs enable the platform cover to be given sufficient rigidity and strength as a platform while having a hollow structure.

Besides, the thus hollow platform cover allows a small device to be installed in the inner space thereof. For example, in the case where the slewing electric motor comprises, in addition to the electric-motor output shaft, a motor body and a rotational speed detector provided on a top of the motor body and operable to detect a rotational speed of the electric-motor output shaft, it is preferable that the rotational speed detector for detecting the rotational speed of the electric-motor output shaft be disposed in the inner space. This makes it possible to detect the rotational speed of the electric-motor output shaft by utilization of the inner space and further protect the rotational speed detector by utilization of the platform cover, thereby eliminating a need for a special protective cover only for protecting the rotational speed detector to achieve reduction in cost.

In the slewing device, it is preferable that the speed reducer is coupled to the electric-motor output shaft of the slewing electric motor in such a manner that the electric-motor output shaft of the slewing electric motor points downward in parallel with the speed-reducer output shaft of the speed reducer and is offset rearward from the speed-reducer output shaft. This structure enables the slewing electric motor and the platform cover installed thereto to be brought into close to the engine room, by utilization of the offset between the electric-motor output shaft and the speed-reducer output shaft. In order to allow an operator to sufficiently reach equipment installed on a rear side of the engine room when the operator performs maintenance of the engine room equipment from a front side of the engine room using the platform cover as a platform, desirable is to possibly bring the platform cover into close to the engine room (to possibly locate it rearward). Meanwhile, the position of the speed reducer depends on a position of a target to be driven by the speed reducer (e.g., a gear provided on a slewing bearing). However, utilizing the above offset makes it possible to bring the slewing electric motor coupled to the speed reducer and the platform cover installed to the slewing electric motor into close to the engine room, even if the position of the speed reducer is fairly away from the engine room.

On the other hand, the speed reducer can be preferable when comprising: a spur gear mechanism including an input-side spur gear connected to the side of the electric-motor output shaft and an output-side spur gear connected to the side of the speed-reducer output shaft; and a planetary gear mechanism provided just below the output-side spur gear in a vertical multi-stage manner so as to transmit the rotation of the speed-reducer output shaft while reducing a speed of the rotation. This vertical arrangement of the spur gear mechanism and the multi-stage planetary gear mechanism allows the height dimension of the speed reducer to be naturally set to a large value by utilization of the arrangement, thereby making it easy to set a height position of the slewing electric motor disposed above the speed reducer and a height position of the platform cover provided on the top of the slewing electric motor to a position which permits the platform cover to adequately function as a platform.

Specifically, although the platform cover, which is required to be located at a position lower than the engine cover in order to function as the platform, may makes it difficult for an operator to place his/her feet thereon and rather decrease the accessible range if the height position of the platform cover is excessively low, the above-mentioned speed reducer having the spur gear mechanism and the vertical multi-stage planetary gear mechanism arranged in the up-down direction allows its vertical dimension, that is, its height dimension, to be smoothly set to a large value, thereby making it easy to locate the platform cover at a height position suitable as a platform.

Furthermore, if the spur gear mechanism gives a horizontal offset between the electric-motor output shaft and the speed-reducer output shaft and the slewing device is disposed such that the electric-motor output shaft is offset rearward from the speed-reducer output shaft, the platform cover is allowed to be located closer to the engine room by utilization of the arrangement of the spur gears in the spur gear mechanism.

What is claimed is:

1. A construction machine having a platform for maintenance work, comprising:
    a lower propelling body;
    an upper slewing body mounted on the lower propelling body through a slewing bearing slewably about an axis perpendicular to a ground surface, the upper slewing body having a rear region provided with an engine room having an upward-facing opening and housing a plurality of equipment including an engine, and an engine cover for selectively opening and closing the opening of the engine room; and
    a slewing device for slewing the upper slewing body, the slewing device including: a slewing electric motor having an electric-motor output shaft; a speed reducer having a speed-reducer output shaft, the speed reducer being coupled to the electric-motor output shaft such that the speed-reducer output shaft is rotated, according to rotation of the electric-motor output shaft, at a speed lower than that of the rotation; and a platform cover, wherein:

the speed reducer is installed forward of the engine room, the speed-reducer output shaft of the speed reducer extending vertically and pointing downward;

the slewing electric motor is disposed forward of the engine room and just above the speed reducer, the electric-motor output shaft of the slewing electric motor vertically extending in parallel with the speed reducer output shaft of the speed reducer; and the platform cover is provided on a top of the slewing electric motor, and has a flat upper surface located at a platform position which is higher than the speed reducer and the slewing electric motor while being lower than the engine cover and adjacent to a front side of the engine room to serve as a platform for maintenance work of equipment housed in the engine room.

2. The construction machine as defined in claim 1, wherein the upper surface of the platform cover has a slip suppressing region for suppressing slip.

3. The construction machine as defined in claim 2, wherein the slip suppressing region includes a plurality of spaced recesses each having a bottom.

4. The construction machine as defined in claim 1, wherein the platform cover has a top wall above the slewing electric motor, the top wall including the upper surface on which an operator can step and a sidewall protruding downward from a peripheral edge of the top wall, the top wall and the sidewall having a shape surrounding an inner space.

5. The construction machine as defined in claim 4, wherein the platform cover comprises a plurality of ribs each protruding downward from a back surface of the top wall to enhance rigidity and strength of the platform cover.

6. The construction machine as defined in claim 4, wherein the slewing electric motor comprises a motor body and a rotational speed detector provided on a top of the motor body and operable to detect a rotational speed of the electric-motor output shaft, the rotational speed detector being disposed in the inner space.

7. The construction machine as defined in claim 1, wherein the speed reducer is coupled to the electric-motor output shaft of the slewing electric motor, the electric-motor output shaft of the slewing electric motor pointing downward and being offset rearward from the speed-reducer output shaft to be closer to the engine room than is the speed-reducer output shaft.

8. The construction machine as defined in claim 1, wherein the speed reducer comprises:

a spur gear mechanism including an input-side spur gear connected to the side of the electric-motor output shaft and an output-side spur gear connected to the side of the speed-reducer output shaft; and a planetary gear mechanism provided just below the output-side spur gear in a vertical multi-stage manner so as to transmit the rotation of the speed-reducer output shaft while reducing a speed of the rotation.

9. The construction machine as defined in claim 8, wherein the spur gear mechanism gives the electric-motor output shaft a horizontal offset rearward from the speed-reducer output shaft.

* * * * *